March 18, 1952     A. E. ERIKSEN     2,589,238
REMOVING OIL FROM VEGETABLE MATERIAL
Filed Sept. 29, 1948
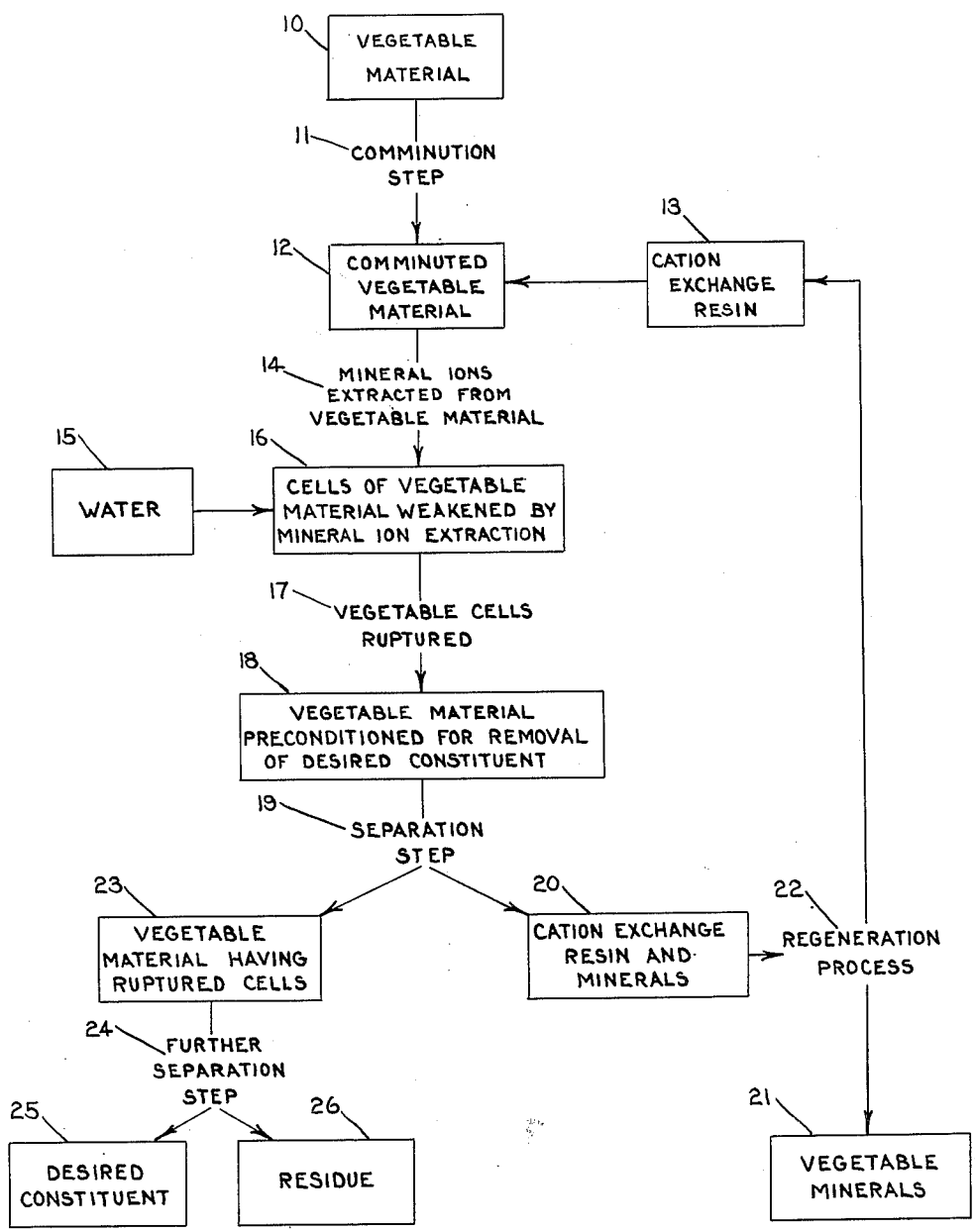
INVENTOR.
ARTHUR E. ERIKSEN
BY
ATTORNEYS Patented Mar. 18, 1952

2,589,238

UNITED STATES PATENT OFFICE 2,589,238

REMOVING OIL FROM VEGETABLE MATERIAL

Arthur E. Eriksen, Delhi, Calif.

Application September 29, 1948, Serial No. 51,758

3 Claims. (Cl. 260—412.2)

The present invention relates to a process for extracting constituents from vegetable materials and more particularly to steps for preconditioning such vegetable materials for the extraction of fats, oils, starch, sugar, enzymes, acids, carbohydrates, proteins and/or other constituents in a generally improved manner.

The cation and the anion exchange methods have long been known in the process of extraction wherein they are employed to remove a desired ingredient from a solution, which ingredient subsequently is separated from the cation or anion exchanger by a process of regeneration and whereby the exchanger employed is available for further use and the desired ingredient obtained in a form susceptible to further purification and treatment.

What is conceived to be the true scope of the present invention is the subsequently described process for extracting constituents from vegetable matter employing the general principles of cation exchange methods in a novel manner achieving improved extraction efficiency, economy, savings in time, and other advantages.

The general problems of extracting constituents from vegetable materials is demonstrated by reference to the conventional method of obtaining sugar from sugar beets. The beets are first sliced or ground to expose as much surface thereof as practical. Water is passed through the sliced or ground beets to leech sugar containing juices therefrom. It has long been well known that only a part of the sugar bearing juices are thus extracted and that the process is inefficient, but nevertheless such procedure has been followed because of the absence, until the present invention, of a superior process for accomplishing the result. The juices thus obtained are then purified and crystallized for commercial use, a substantial portion of the sugar in the sugar beet being discarded with the pulp because of the inefficient extraction methods.

The extraction of oil from soy beans, cotton seed, flax seed, peanuts, olives, and other oil bearing vegetable materials has likewise been an inefficient procedure. In the removal of oil from such material it is the conventional procedure to grind and to press the material to remove the oil or to pass an oil solvent such as normal hexane over the material in ground form for solvent extraction. A considerable portion of the residual oil remaining in the pulp after the extraction of oil therefrom under conventional processes is known to exist in the cellular structure of the vegetable material. It is impossible to grind such material to such a degree of fineness as to break the individual cells and to release the oil from the cells and yet to leave the ground material in a form which can be subjected to pressure to squeeze the oil therefrom. Similarly, the extraction of starches, enzymes, and other constituents from vegetable material has been generally inefficient because of the inability successfully to remove the constituents from intact cells remaining in the vegetable material after treatment.

An object of the present invention, therefore, is to facilitate the extraction of oils, fats, starches, sugar, enzymes and other constituents from vegetable material by making readily accessible for extraction such constituents lost by normal extraction processes by an inability to remove the constituents locked in the cellular structure of the vegetable material.

Another object is to remove constituents from vegetable material to an extent more nearly approaching exhaustion thereof than has heretofore been possible.

Another object is to minimize the time required to extract materials from vegetable sources thereof.

Another object is to reduce the costs incident to the extraction of constituents from vegetable material.

Another object is to provide for use in extraction processes for vegetable materials a cell rupturing step freeing constituents of the material for improved extractive convenience and efficiency.

A further object is to provide an extraction process for materials of vegetable origin characterized by an improved purity in the constituent extracted.

A still further object is to provide a process for extracting vegetable oils from vegetable material minimizing the susceptibility of the extracted oils to rancidity.

Other objects and advantages will become apparent in the subsequent description in the specification.

The drawing is a schematic representation, or flow diagram, illustrating the operation of the process of the present invention to extract a constituent from a vegetable material showing a cation exchange reaction employed to precondition the cells of the vegetable material for extraction of their constituents and a regeneration of the exchanger for subsequent use.

In the drawing a vegetable material from which a constituent is to be extracted is indicated generally at 10. The kind of vegetable material employed is of course dependent upon the type of constituent desired. For example, where it is desired to obtain vegetable oil, the vegetable material may conveniently comprise soy beans, cotton seed, flax seed, peanuts, olives, or any other oil bearing vegetable material. When starch is the constituent desired, potatoes, wheat, corn, or other appropriate source material is utilized. To obtain sugar, sugar beets or sugar cane is commonly the source material.

The present invention is obviously not limited to the examples of source material enumerated, but merely is illustrated thereby. Vegetable materials are known generally to contain insoluble mineral compounds in their cellular structures, a condition of which advantage is subsequently taken in the process of the present invention.

The vegetable material is preferably mechanically comminuted, as at 11, to a finely divided condition schematically represented at 12. This may involve grinding or breaking into small fragments, cutting, rasping, grating, slicing, chopping, levigating, pulverizing, triturating, or any other suitable expedient. The purpose of the comminution of the material is to prepare the material in a suitable physical form for subsequent treatment and is significant in facilitating speed of subsequent processing. The comminution preferably does not divide the vegetable material so finely as to make subsequent pressing operations difficult.

A cation exchange 13 resin is intimately admixed with the comminuted vegetable material 12. By a cation exchange resin is meant any material which is capable of extracting positive ions from solution. Examples thereof are aluminum silicate, carbonaceous lignin, polymerized resins, zeolite sands, commonly referred to as natural green sands, and other natural and synthetic cation exchange resins. These materials are sufficiently well known in the art and constitute such a well defined class of materials as to make further compounding of examples thereof unnecessary. Any suitable cation exchange resin may be employed.

The cation exchange resins are intimately admixed with the comminuted vegetable material for a sufficient time and at a temperature and in sufficient quantity to extract the mineral ions from the insoluble mineral compounds, previously mentioned, of the vegetable material, replacing said mineral ions with hydrogen ions having the cation resin as a source, resulting in a water soluble organic substance. The basic reactions are demonstrated as follows:

Cation exchange resin $(H_2) + CaCl_2 \longrightarrow$
Cation exchange resin $(Ca) + 2\ HCl$ Cation exchange resin $(H_2) + MgCl_2 \longrightarrow$
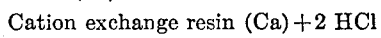
Cation exchange resin $(Mg) + 2\ HCl$ Cation exchange resin $(H_2) + CuSO_4 \longrightarrow$
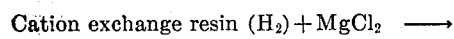
Cation exchange resin $(Cu) + H_2SO_4$ A sufficient quantity of cation exchanger comprises from 80 to 87% of the mineral ions contained in the vegetable material. The quantity of mineral ions may be determined by trial and error method, or by any known method of analysis in the vegetable material. The time and the temperature are not critical to the operation of the process of the present invention, but obviously influence the degree of completion of the removal of mineral ions from the insoluble mineral compounds of the vegetable material. At normal temperature only a few minutes are required for the replacement of the mineral ions in the cells of the vegetable material with hydrogen ions in the step exemplified at 14.

The reacting of the cation exchanger on the mineral ions is preferably accomplished in the presence of water or with water added thereafter. Normally, the comminuted vegetable material has sufficient natural water for the purpose, but when a dehydrated material is employed, or when water is otherwise desired, water may be added. In the drawing water 15 is shown as being added to the mixture of the cation exchange resin and vegetable material. In most instances, this is natural water at 10 and is present during the entire process.

16 represents the vegetable material in a comminuted state containing the cation exchanger in the presence of water. As previously mentioned, the cation exchanger supplants the mineral ions in the insoluble mineral compounds of the vegetable material with hydrogen ions to form water soluble organic substances. In the presence of the water, the soluble substances are dissolved and the cells of the vegetable material greatly weakened by the removal of the soluble materials into solution. Further, the cells are ruptured by the water, as illustrated at 17. It is believed that the rupturing takes place as a result of the difference in osmotic pressure interiorly and exteriorly of the cells. It is to be understood that the present invention is not limited to such explanation, but is merely illustrated thereby. It is conceivable that the insoluble mineral compounds act as a binder for the cellular structure and that their transformation to water soluble substances and subsequent removal merely removes the binder for the cellular materials. It is conceivable that the volume of water entering the cells to replace the water soluble material is of a volume greater than the volume of the material the water replaces. It is even conceivable that the rupturing of the cells results from the speed with which the water enters the cell. The result achieved by the mixing of the cation exchange resins with the comminuted vegetable material in the presence of water serves to remove minerals from the cells and to rupture the cells. The rupturing of the cells frees constituents thereof for removal from the vegetable material while leaving the divided vegetable material in a physical condition susceptible to being pressed for extraction of desired constituents. These steps of removing mineral ions from the vegetable material and rupturing the cells of said material to achieve a material 18 preconditioned for efficient extraction of desired constituents are significant aspects of the invention.

The cation exchange resins and the minerals shown at 20 extracted from the vegetable material are separated from the remaining vegetable material as at 19, by means of a centrifuge, precipitation, solvent extraction or any other suitable method, many of which are well known in the art. Subsequently mineral ions 21 may be separated from the cation exchanger 13 by a regeneration process 22 resulting in purified vegetable minerals as an end product and the making available of the cation exchanger in regenerated condition for additional use, as shown. The regeneration process is conventional and is demonstrated as follows:

(Ca) Cation exchange resin $+ H_2SO_4 \longrightarrow$
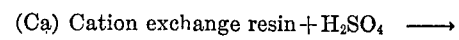
Cation exchange resin $(H_2) + CaSO_4$ (Mg) Cation exchange resin $+ 2\ HCl \longrightarrow$
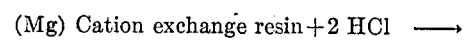
Cation exchange resin $(H_2) + MgCl_2$ (Cu) Cation exchange resin $+ H_2SO_4 \longrightarrow$
Cation exchange resin $(H_2) + CuSO$ The removal of the cation exchanger 13 and the minerals 21 from the mixture shown at 18 leaves the comminuted vegetable material illustrated at 23 preconditioned for the removal of the desired oil, starch, sugar, or other constituent. It is noteworthy that at 23 substantially all of the mineral ions have been removed from the material, thus performing, as an incidence to the cell rupturing, a desirable purification operation. The preconditioned vegetable material with the ruptured cells at 23 is then treated in any suitable manner at 24 to remove the constituent desired. For example, where olives have been used at 10, and olive oil is the desired constituent, the preconditioned material at 23 may be pressed to remove the olive oil as an end product shown at 25, leaving a residue shown at 26. In actual operation, the preconditioning by the process of the present invention of olives for the removal of olive oil therefrom by means of a press, results in an increased average yield of ten gallons of olive oil per ton of olives employed at 10. It will be apparent that the present invention is not limited to the removal of oil by means of a mechanical press, but may employ any other appropriate method at 24, such as solvent extraction, centrifuge extraction, flotation, precipitation, or otherwise. Not only does the process of the present invention give a superior yield of oil, but inasmuch as the mineral ions have been removed from the material, the resulting oil is not as susceptible to rancidity as is normally the case.

Similarly, where other vegetable materials are employed at 10 and other constituents desired, such as starches, sugars, enzymes and the like, the step of extracting the desired constituent from the preconditioned vegetable material at 24 is accomplished by any suitable method.

The process of the present invention involving preconditioning of the cells of vegetable material for extraction of desired constituent material reduces required extraction time. The extraction is more economical in that the additional expense of the rupturing of the cells is far less than the additional yield of the desired constituent from a given source thereof. The constituent when removed is in a purified condition and in most instances requires no subsequent purification, which is a further saving in time and expense. The residue left at 26 contains relatively little or no minerals and relatively little of the constituent obtained at 25, and therefore is in a condition more susceptible for use as a by-product or convenient disposal. The minerals resulting as an incidental by-product of the cellular treatment are valuable and augment the advantages of the present invention.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent processes.

Having described my invention, what I claim as new and desire to secure by Letters Patent is:

1. A process for removing oil from oil bearing vegetable material containing insoluble mineral compounds comprising comminuting the vegetable material, mixing the comminuted vegetable material with a cation exchange resin containing hydrogen ions to supplant the mineral ions in the insoluble compounds with hydrogen ions of the cation exchange resin and thus change the insoluble compounds to soluble organic substances, dissolving said soluble organic substances in water to weaken the cells of the vegetable material, extracting the cation exchange resin from the mixture in combination with the mineral ions removed thereby, and extracting the oil from the resultant remaining mixture.

2. A process for removing oil from oil bearing vegetable material containing insoluble mineral compounds comprising comminuting the vegetable material, reacting a cation exchange resin containing hydrogen ions on the comminuted vegetable material in a quantity, for a time, and at a temperature sufficient to supplant substantially all of the mineral ions in the insoluble compounds with hydrogen ions from the cation exchange resin to form soluble organic substances, removing the cation exchange resin and mineral ions, dissolving the soluble organic substances in water to effect their removal from the cellular structure of the vegetable material, and subjecting the resulting mixture containing cellular structure weakened by the extraction of the soluble organic substances therefrom to pressure to remove the oil.

3. In the extraction of vegetable oil from oil bearing vegetable material containing insoluble mineral compounds the steps of preconditioning the vegetable material for the extraction of oil comprising mixing the vegetable material with a cation exchange resin in the presence of water to supplant the mineral ions of the insoluble mineral compounds with hydrogen ions of the cation exchange resin to form soluble organic substances, removing the cation exchange resin and supplanted ions, and dissolving the soluble organic substances in water to effect their removal from the cells of vegetable material and to rupture the cells.

ARTHUR E. ERIKSEN.

REFERENCES CITED

The following references are of record in the file of this patent:

UNITED STATES PATENTS

| Number | Name | Date |
|---|---|---|
| 2,323,483 | Myers | July 6, 1943 |

FOREIGN PATENTS

| Number | Country | Date |
|---|---|---|
| 509,710 | Great Britain | 1939 |

OTHER REFERENCES

Englis et al., Ind. & Eng. Chem., July 1942, pages 864–867.